United States Patent [19]

Ozeki et al.

[11] Patent Number: 4,584,678
[45] Date of Patent: Apr. 22, 1986

[54] CONTENTION-TYPE DATA COMMUNICATION SYSTEM

[75] Inventors: Takeshi Ozeki; Toshifumi Tamura, both of Tokyo; Mutsumi Fujihara, Yokohama, all of Japan

[73] Assignee: Kabushiki Kaisha Toshiba, Kawasaki, Japan

[21] Appl. No.: 605,268

[22] Filed: Apr. 30, 1984

[30] Foreign Application Priority Data

May 2, 1983 [JP] Japan ................. 58-77721

[51] Int. Cl.[4] ........................ H04J 3/02; H04Q 3/00
[52] U.S. Cl. .................... 370/85; 340/825.5
[58] Field of Search ........... 370/85, 86, 60, 94, 370/110.1; 340/825.5; 455/606

[56] References Cited

U.S. PATENT DOCUMENTS

| | | | |
|---|---|---|---|
| 3,796,992 | 3/1974 | Nakamura et al. | |
| 4,380,088 | 4/1983 | Lipcon | 370/94 |
| 4,380,761 | 4/1983 | Boggs | 340/825.5 |
| 4,409,592 | 10/1983 | Hunt | 370/94 |

FOREIGN PATENT DOCUMENTS

| | | | |
|---|---|---|---|
| 0004376 | 10/1979 | European Pat. Off. | |
| 0124381 | 5/1983 | European Pat. Off. | 370/94 |
| 2101457 | 1/1983 | United Kingdom | |
| 302844 | 6/1971 | U.S.S.R. | 340/825.5 |

OTHER PUBLICATIONS

Computer Design, vol. 21, No. 12, Dec. 1982, pp. 32, 37, Winchester, U.S.; "Factory Environment Fiber Optic LAN Provides Emi Immunity, Increases Security".
Local Networks Strategy & Systems, Mar. 1983, pp. 223-238, Northwood, GB; A. Colvin: "CSMA with Collision Avoidance, A New Technique for Cost Reduction", pp. 232-237, paragraphs 5-7.
"Fibernet II: An Active Star-Configured Fiber-Optic Local Computer Network with Data Collision Sensing", OFC'82, Tuff 1; E. G. Rawson et al; Apr. 1982.
Annual Meeting of IECE, Japan, "A Study on Data Collision Detection Circuit for Optical Star Networks", No. 341; K. Oguchi et al; Aug. 1982.

Primary Examiner—Douglas W. Olms
Assistant Examiner—Curtis Kuntz
Attorney, Agent, or Firm—Oblon, Fisher, Spivak, McClelland & Maier

[57] ABSTRACT

A contention-type data communication system such as an optical star-configured network comprises a plurality of stations connected with one another through data bus. To detect a signal collision quickly, each of the stations is arranged to transmit a collision-detecting packet which has a predetermined time length $T_1$ and a predetermined pulse pattern, and then transmit a data packet after a time interval $T_2$. The number or pattern of pulses received during a time period $T_1 + T_2$ from the start of reception of a collision-detecting packet is compared with that of the self-transmitted collision-detecting packet so that the signal collision is detected when noncoincidence occurs.

12 Claims, 12 Drawing Figures

F I G. 1
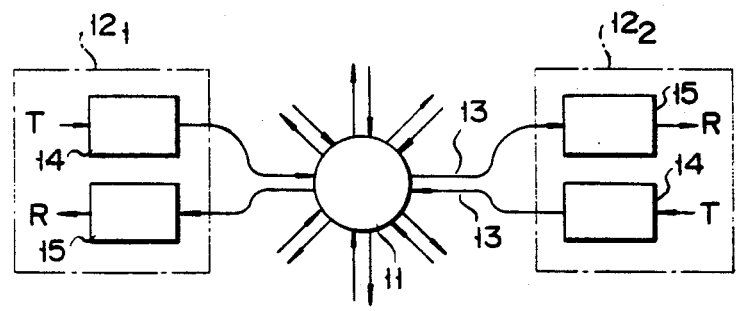
F I G. 2
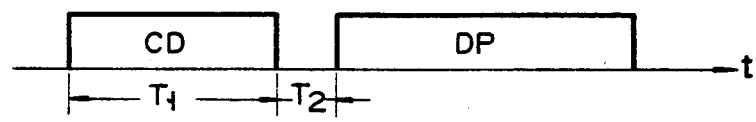
F I G. 4
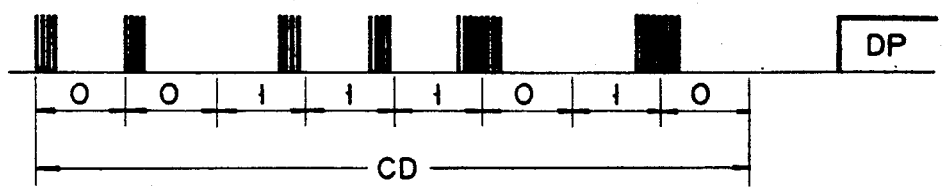

F I G. 6
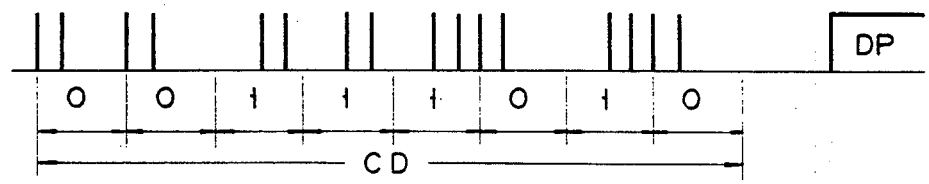
F I G. 7
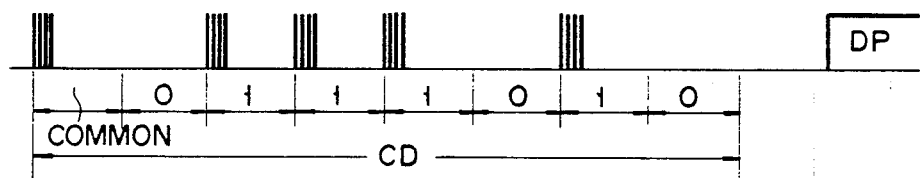
F I G. 8
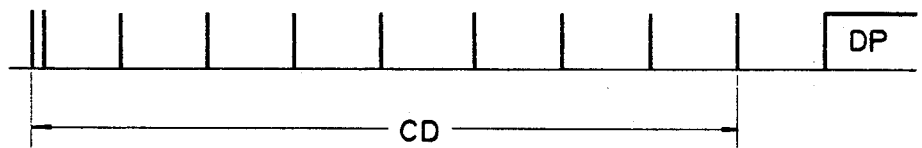

CONTENTION-TYPE DATA COMMUNICATION SYSTEM

BACKGROUND OF THE INVENTION

The present invention relates to a contention-type data communication system.

As a data communication system, there have been studied and developed various kinds of local area networks wherein plural terminals spaced apart are connected through data bus and wherein a distributed processing of data is achieved using common hardware and software. Particularly a contention-type system has attracted attention these days instead of systems in which the use of data bus is alloted to each of stations in a time-sharing manner or subject to centralized control. This contention-type system allows each of stations to detect an idle condition of data bus and transmit data at a desired time. This system is therefore simple in construction.

With the contention-type data communication system, however, when the data bus is detected to be idle plural stations may transmit data at the same time so that a data collision occurs on the data bus to disturb information. Various systems have been therefore made to detect the communication collision as soon as possible and stop the data transmission.

According to one of conventional collision detecting systems, a signal transmitted from a transmitter onto data bus and a signal received by a receiver from the data bus are compared by an exclusive OR circuit at each station.

According to another conventional system, a collision between signals is detected on the basis of change of signal level on the data bus, which is caused when signals are simultaneously transmitted from stations onto the data bus.

These collision detecting systems theoretically allow an exact detection of signal collision. Signals transmitted over the data bus are often subject to a large loss. The level attenuation of signal due to the loss amounts to more than 10 dB. Particularly in the case of a data bus system wherein signals are transmitted over optical fibers, high-speed data transmission can be achieved, but a signal is subject to great loss at a coupler. In addition, the signal loss is also large at connecting parts of fibers. When a threshold value for the signal level comparison is predetermined, therefore, the collision cannot be detected exactly.

SUMMARY OF THE INVENTION

An object of the present invention is therefore to provide a contention-type data communication system capable of detecting a communication collision without being influenced by levels of received signals.

Another object of the present invention is to provide a contention-type data communication system capable of quickly and exactly detecting communication collisions.

According to a data communication system of the present invention, plural stations are connected with one another through data bus, and each of the stations is arranged to monitor data transmitted therefrom over the data bus.

In order to achieve the above objects of the present invention, each of the stations comprises means for transmitting a collision detecting packet which has a predetermined time length $T_1$ and a predetermined pulse pattern, and then transmitting a data packet after the lapse of a time period $T_2$, and means for detecting the communication collision by comparing the number or pattern of pulses received during the time period $(T_1+T_2)$ after the start of reception of the collision-detecting packet with that of the self-transmitted collision-detecting packet.

According to the present invention, the communication collision can be detected with reliability by examining the content of the received collision detecting packet, when plural stations start their communications at the same time. Further, the detection of collision can be carried out for the certain time period after the reception of the collision detecting packet, so that unnecessary occupation of the network because of the delay in detecting the collision can be avoided, thereby enhancing the throughput of the network. Furthermore, the collision detection according to the present invention depends upon the count of pulses or the comparison of the pulse pattern, so that it can be attained with reliability without being influenced by the level difference between signals. Still further, it can be realized using comparatively simple digital circuit technics, thereby allowing the system to be constructed practically and economically.

BRIEF DESCRIPTION OF THE DRAWINGS

FIG. 1 shows an optical star-configured network embodying the present invention;

FIG. 2 shows an arrangement of packets transmitted from each station shown in FIG. 1;

FIG. 4 shows an example of collision detecting packet;

FIGS. 6, 7 and 8 show other collision detecting packets;

DETAILED DESCRIPTION OF THE PREFERRED EMBODIMENTS

Figure 3:
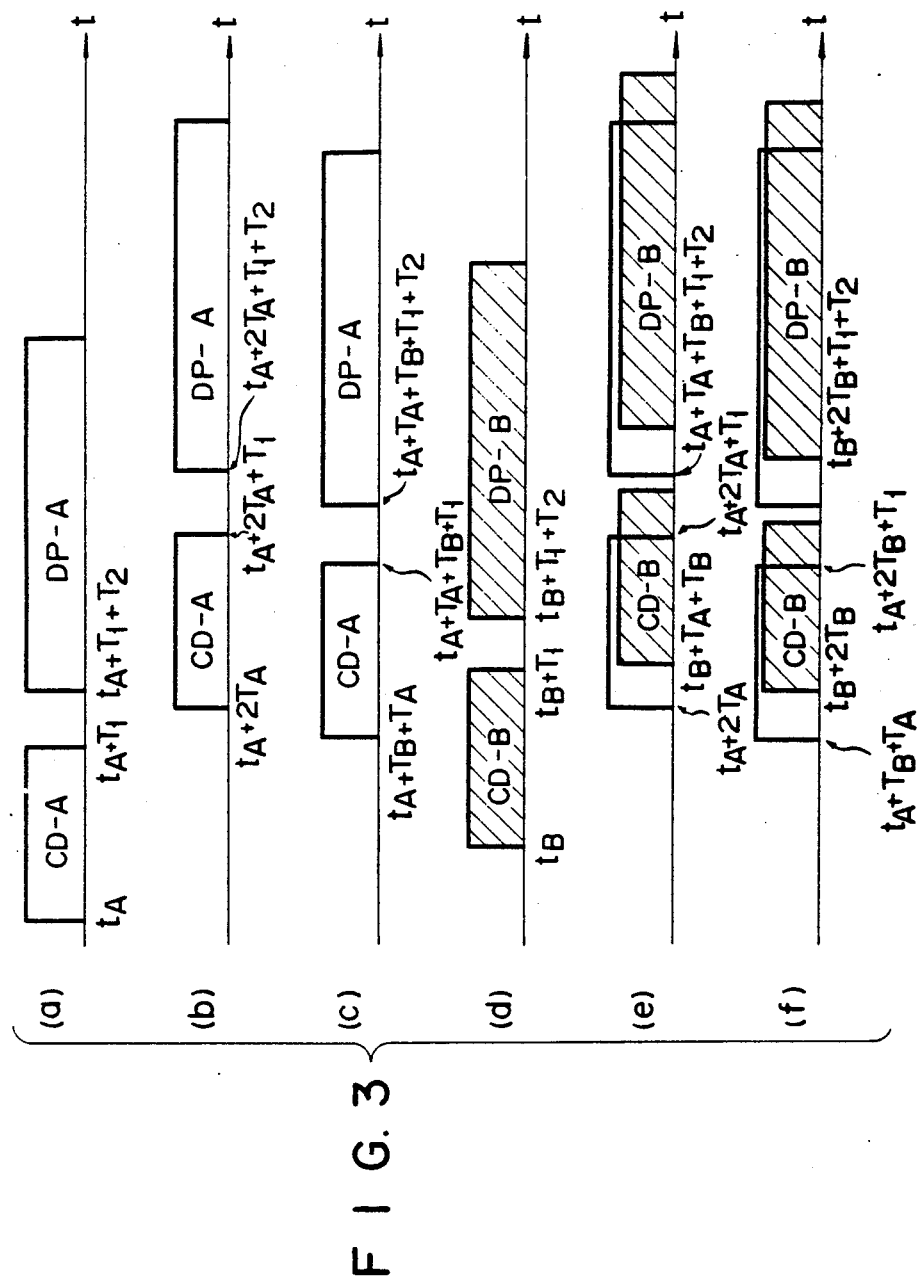
FIG. 3 is a diagram for explaining the principle of communication collision in the network shown in FIG. 1.

Referring to FIG. 1, an optical star-configured network of the present invention comprises an optical star coupler 11, and plural stations 12 ($12_1$, $12_2$, - - - ) connected to coupler 11 through optical fibers (or data bus) 13. In each station 12, a light-emitting element such as a laser diode, for example, is used as a light source 14 for transmitting optical signals, and a PIN or avalanche diode, for example, is used as an optical detector 15 for receiving the optical signals. In each of stations an optical signal is transmitted from light source 14 to the other stations through star coupler 11 and a part of the transmitted signal is returned back from the coupler to the transmitting station to be detected by optical detector 15 so that the communication is monitored.

It is assumed that station $12_1$ is located most remotely from start coupler 11 and that station $12_2$ is next to station $12_1$. It is also assumed that propagation delay times between star coupler 11 and station $12_1$ and between coupler 11 and station $12_2$ are $T_A$ and $T_B$, respectively.

Each of stations 12 is arranged to transmit a collision-detecting packet, having a predetermined pulse pattern over a time period $T_1$, and then transmit a data packet at an interval of $T_2$ after the transmission of the collision-detecting packet. FIG. 2 shows a relationship between the collision detecting packet CD and the data packet DP.

The data communication between stations in a case where the data bus is not in use is carried out as follows:

when a request-to-send occurs at station $12_1$, a collision detecting packet CD-A is transmitted at a time $t_A$ as shown in FIG. 3(a). This collision-detecting packet CD-A starts to be received by station $12_2$ at a time $(t_A + T_A + T_B)$, as shown in FIG. 3(c) and by the transmitting station $12_1$ at a time $(t_A + 2T_A)$, as shown in FIG. 3(b). Even if no request-to-send occurs at station $12_2$ during a time period from time $t_A$ to time $(t_A + T_A + T_B)$, and another request-to-send occurs at station $12_2$ during a time period from time $(t_A + T_A + T_B)$ to a time at which the reception of the packet from station $12_1$ is finished, the station $12_2$ can detect by carrier detecting function that the data bus is busy. The packet transmission from station $12_2$ is thus postponed so that the communication from station $12_1$ to station $12_1$ is normally finished.

It is assumed that a request-to-send occurs at station $12_2$ during a time period from time $t_A$ to time $(t_A + T_A + T_B)$ under the above condition. Since the collision-detecting packet DC-A transmitted from station $12_1$ is not received yet by station $12_2$ at a time $t_B$ between $t_A$ and $t_A + T_A + T_B$, as shown in FIG. 3(c), the station $12_2$ judges that the data bus can be used and transmits a collision-detecting packet CD-B, as shown in FIG. 3(d). At this time the receiving states of stations $12_1$ and $12_2$ are shown in FIGS. 3(e) and 3(f), respectively. It will be understood that the packets transmitted from the stations collide with each other.

For the purpose of quickly and reliably detecting signal collisions, the present invention transmits the collision-detecting packet CD prior to the data packet DP and interposes a certain time interval between the packets CD and DP. The time $T_1$ which the collision detecting packet CD occupies, and the time interval $T_2$ thereafter will be described in more detail. As apparent from FIG. 3(e), the station $12_1$ starts receiving the collision-detecting packet CD-B transmitted from station $12_2$ with a delay of time $\tau_A$ after the station $12_1$ has started receiving the collision-detecting packet CD-A transmitted therefrom. $\tau_A$ is given by $$\tau_A = (t_B + T_A + T_B) - (t_A + 2T_A) \quad (1)$$
$$= t_B - t_A + T_B - T_A$$

The maximum value of $\tau_A$ given by equation (1) is $t_A + T_A + T_B$ since $t_B$ ranges from $t_A$ to $t_A + T_A + T_B$. Accordingly, $$\tau_A \leq (t_A + T_A + T_B) - t_A + T_B - T_A \quad (2)$$
$$= 2T_B$$

In this case, therefore, the station $12_1$ starts receiving the collision-detecting packet CD-B transmitted from station $12_2$ with a delay of $2T_B$ at maximum after the collision-detecting packet CD-A transmitted from station $12_1$ has started to be received.

Considering all cases, the maximum value of $\tau_A$ is obtained when the station $12_1$ transmits the collision-detecting packet CD-A after the station $12_2$. In this case $\tau_A$ becomes two times the propagation delay time between the star coupler and the station $12_1$ which is remotest from the coupler, that is, $2T_A$. $2T_A$ equals the maximum propagation time $\tau$ on the data bus in the optical star network.

In the optical star network, the following relationship is established between $\tau$ and cable length $l_{max}$ extending from the optical star coupler to the remotest station.

$$\tau = 2 \times \frac{l_{max}}{v} \quad (3)$$

wherein v represents a pulse propagation velocity.

It will be understood from the above that if the sum of $T_1$ and $T_2$ is set larger than the maximum propagation delay time $\tau$ on the data bus, any of the stations receives no data packet DP and can receive, in the case where a collision occurs, the collision-detecting packet CD transmitted from a station which causes the collision, within the time period $T_1 + T_2$ after it starts receiving the collision-detecting packet CD. If the collision-detecting packet CD is made to have a pulse pattern of a predetermined regularity, therefore, the communication collision can be reliably detected within the above-mentioned time period.

Practical arrangements of the collision-detecting packet CD will be described below. Referring to FIG. 4, the collision detecting packet CD is divided into plural slots, each of which includes a predetermined number (J) of on-bits (pulses) and a predetermined number of off-bits. It is assumed that the collision-detecting packet CD has a length of 128 bits as a whole, comprising 8 time slots each consisting of 16 bits (4 on-bits and 12 off-bits). The total number of on-bits is $4 \times 8 = 32$. The on-bits are arranged together at the head of the front-half or at the tail of the back-half of each slot.

The number of the time slots is selected to be an integer I larger than K which is determined by $K = [\log_2 (N-1)] + 2$ wherein [x] represents the maximum integer not exceeding x, and N, the maximum number of the stations connected to data bus. In the example of FIG. 4 the number of stations assumed to be 128 and thus the packet CD comprises 8 time slots in total which consist of 7 time slots represented by $[\log_1 127] + 1$ and one fixed head time slot representing the beginning of collision-detecting packet. The second through eighth slots corresponds to the address "0111010" of a transmitting station such that the on-bits are located at the head of the front-half of each time slot corresponding to "0" and at the tail of the back-half of each time slot corresponding to "1".

Figure 5:
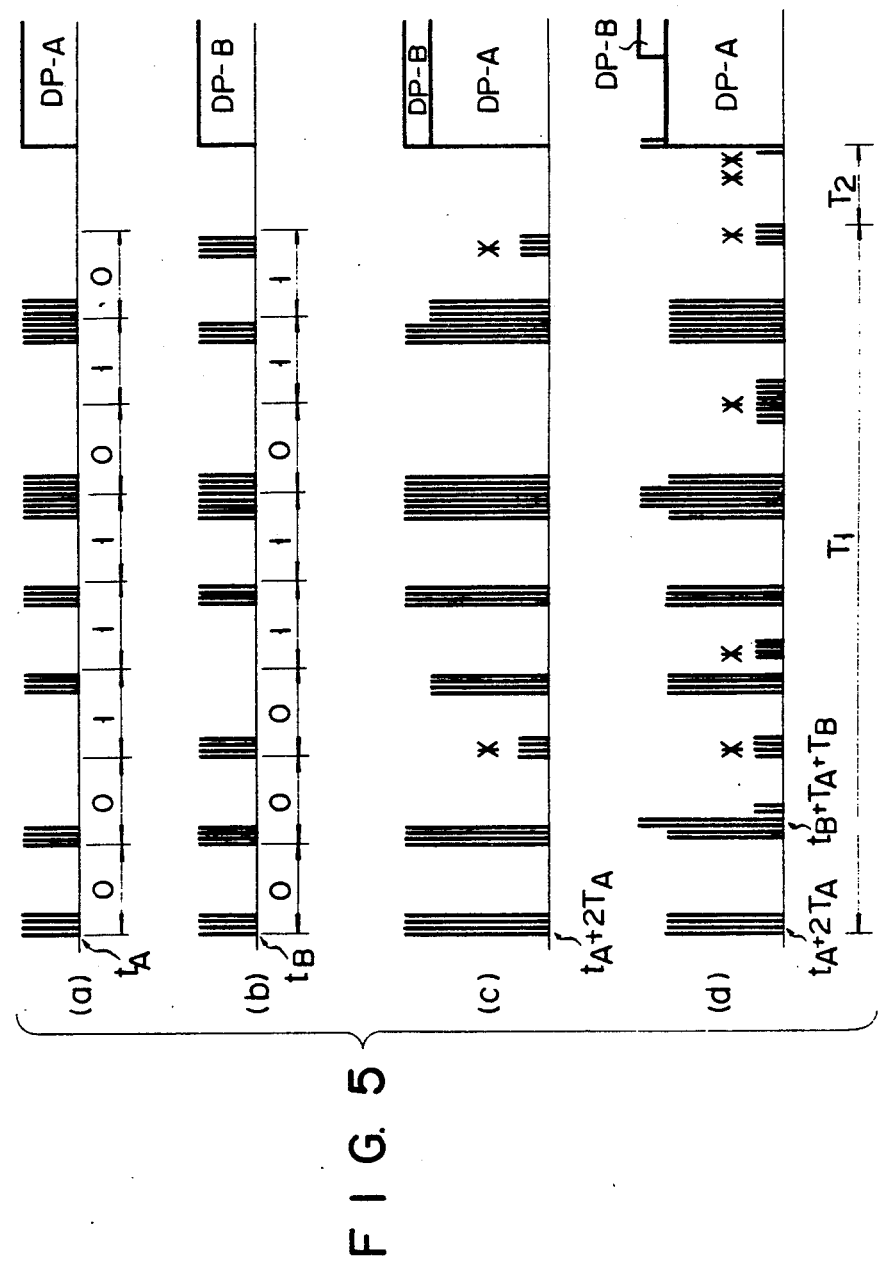
FIG. 5 is a diagram for explaining the operation of detecting a collision, using the collision detecting packet of FIG. 4.

A collision between the collision-detecting packets will be described with reference to FIG. 5. FIG. 5 shows the collision between station $12_1$ having the address "0111010" and station $12_2$ having an address "0011011". FIGS. 5(a) and 5(b) show transmitting packets of stations $12_1$ and $12_2$, respectively. It is assumed that stations $12_1$ and $12_2$ start transmission at $t_A$ and $t_B$, respectively. When the packets from stations $12_1$ and $12_2$ collide on the data bus, the station $12_1$ receives the packet transmitted therefrom at a high level but the packet from station $12_2$ at a lower level.

FIG. 5(c) shows a case where the two packets are received at the same time. Since the first and second time slots of the collision-detecting packets of stations $12_1$ and $12_2$ have the same pulse pattern of "0", the on-bits are superposed to have a large amplitude but cannot be distinguished from each other with respect to time. Since the third and eighth time slots are different in pulse pattern, however, the pulses from stations are received at different times. Symbol * in FIG. 5(c) represents the pulses transmitted from station $12_2$. As each station knows the number of pulses or the pulse pattern of the self-transmitting collision-detecting packet, it compares the number of received pulses or the received pulse pattern with the number of transmitting pulses or the transmitting pulse pattern. For example, the number of pulses may be counted for each time slot. In the case of FIG. 5(c), the number of received pulses in each of the third and eight slots is 8 which is different from the number (4) of transmitted pulses per time slot. The occurrence of a collision can be found. Alternatively, the number of pulses may be counted which are received within a time period $T_1 + T_2$ after the collision-detecting packet has started to be received. In this case, the occurrence of collision can be found when the number of the pulses counted exceeds a predetermined value.

In FIG. 5(c), the number of counted pulses exceeds 32 at the beginning of the eighth time slot so that the occurrence of a collision can be detected at this time.

FIG. 5(d) shows a case where the collision-detecting packet transmitted from station $12_1$ is received prior to that of station $12_2$. Similarly in the case shown in FIG. 5(c), the collision can be detected. In this case, pulses represented by symbol ** are received within a time period $T_2$ after the reception of the collision-detecting packet. A collision-detecting packet is to be received for the time period $T_1$. The reception of the pulses during the time period $T_2$ means that any signal is transmitted from any one of the other stations, thereby enabling the occurrence of collision to be judged.

When the number of on-bits in each time slot is set $J = 4$ and the positions of on-bits are set as described above, the maximum consecutive number of on-bits becomes 8. Although not seen in FIGS. 5(c) and 5(d), it may happen that the number of consecutive on-bits in a received collision detecting packet exceed 8, depending upon the timings at which the transmitting address and the collision detecting packet are received. The occurrence of collision can also be judged by the maximum consecutive number of on-bits. The occurrence of collision can also be judged when the number of consecutive on-bits becomes different from J or $2 \times J$.

A discriminator for detecting collisions may malfunction due to noise. Providing that the number of on-pulses of the collision detecting packet is M, the occurrence of collision can be found when the number of pulses which arrive within the time period $T_1 + T_2$ after the start of reception of the collision detecting packet is larger than M. In order to avoid misjudgement on the basis of the malfunction of a discriminator, however, it may be judged that the collision has occurred only when the number of pulses is larger than $M + Q (Q > 0)$. The value of Q may be set $0 \leq Q < J$ when the number of on-bits in each slot of the collision detecting packet is J.

FIG. 6 shows another example of the collision-detecting packet. Similarly in the above example, the head slot is common to all of the stations, and the other slots correspond to the address of each station. A predetermined number (J) of on-bits are located at the head portion of the front half for the address bit "0" and J on-bits at the head portion of the rear half of each time slot for the address bit "1". The time $T_1$ of the collision-detecting packet CD and the time interval $T_2$ are set similar to the above-described example.

It will be appreciated that, in the arrangements of the collision-detecting packets shown in FIGS. 4 and 6, a series of pulses are position-modulated in each slot in accordance with corresponding bit of the address of a station.

FIG. 7 shows a further example of the collision-detecting packet. The head time slot is common to all of the stations, and the other time slots made to correspond to the address of each station, so that no on-bit for "0" and several on-bits for "1". The time $T_1$ of the collision detecting packet CD and the time interval $T_2$ are set similar to the above-described examples.

FIG. 8 shows a still further example of the collision-detecting packet CD. This example has no time slot but its head portion is common to all of the stations, at which one or more pulses are arranged. The remaining portion has on-pulses the number of which corresponds to the address. The time $T_1$ of the collision-detecting packet CD and the time interval $T_2$ are set similar to the above-described examples.

Figure 9:
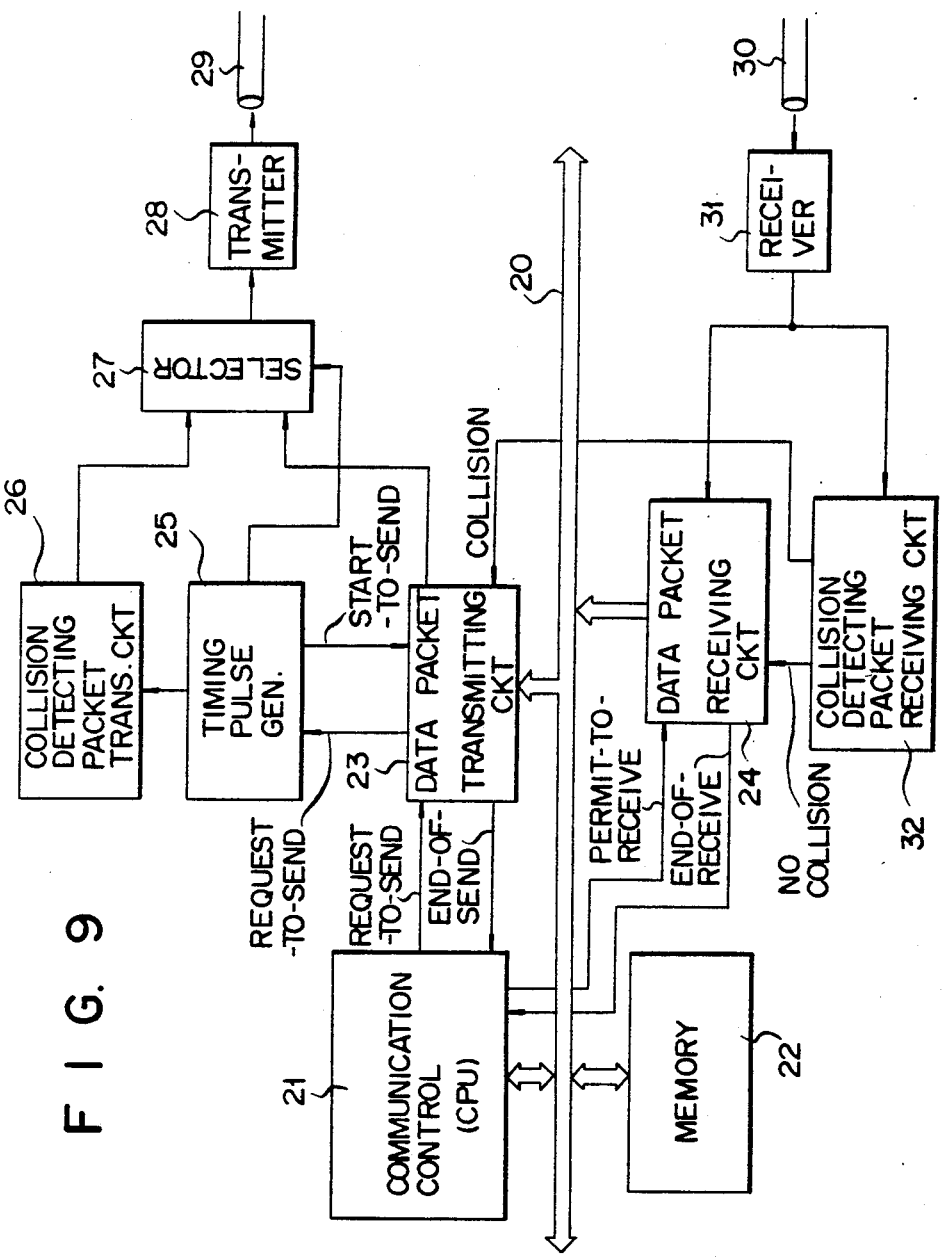
FIG. 9 is a block diagram of each of stations in the network of FIG. 1.

An arrangement of each of the stations according to the present invention will be described referring to FIG. 9.

A communication control unit (CPU) 21, memory 22, data packet transmitting circuit 23 and data packet receiving circuit 24 are connected to a bus 20. The memory 22 serves to store transmit data and receive data. When data is to be transmitted, a request-to-send is issued from communication control unit 21, and data packet transmitting circuit 23 receives, in response to it, a data packet signal to be transmitted from memory 22, and stores the signal temporarily. At the same time, the data packet transmitting circuit 23 sends a request signal to a timing pulse generating circuit 25 to ask sending of a collision-detecting packet. The timing pulse generating circuit 25 drives a collision-detecting packet transmitting circuit 26, in response to the request signal, to send the collision-detecting packet signal which has the time length $T_1$ and a predetermined pattern. Responsive to the request signal, the timing pulse generating circuit 25 also applies, to a selector 27, a control signal to select the collision-detecting packet signal. The collision-detecting packet signal is thus applied to a transmitter 28 via selector 27 so that it is transmitted over an optical fiber 29 during the time period $T_1$. After the lapse of the time period $T_1 + T_2$ from the issuance of the request to send the collision-detecting packet from data packet transmitting circuit 23, the timing pulse generating circuit 25 applies a start-to-send signal to data packet transmitting circuit 23 and also changes over selector 27 to select a data packet. The data packet is thus transmitted after the lapse of the time period $T_1 + T_2$ from the transmission start of the collision-detecting packet. When the transmission of data packet finishes, an end-of-send signal is issued from data packet transmitting circuit 23 to communication control unit 21.

A signal transmitted over optical fiber 30 is received by a receiver 31. The received signal is supplied to data packet receiving circuit 24 and collision-detecting packet receiving circuit 32. The collision-detecting packet receiving circuit 32 serves to detect a collision between signals sent from stations. The data packet receiving circuit 24 is made ready for receiving data packet in response to a permit-to-receive signal issued from communication control unit 21, and enabled to receive the data packet in response to a no-collision signal from the collision-detecting packet receiving circuit 32, which represents no collision between signals. The signal received by receiver 31 are therefore received at first by collision-detecting packet receiving circuit 32.

The collision-detecting packet receiving circuit 32 receives pulses for the time period $T_1+T_2$ from the reception of the collision-detecting packet, and counts them or compares the pulse pattern with that of the self-transmitted collision-detecting packet to detect whether or not the collision has occurred. When the collision is detected, the collision-detecting packet receiving circuit 32 issues a collision-detecting signal to data packet transmitting circuit 23 to stop the transmission of the data packet signal. When no collision is detected for the time period $T_1+T_2$, the collision-detecting packet receiving circuit 32 instructs data packet receiving circuit 24 to receive the data packet signal. The data packet signal received by data packet receiving circuit 24 is stored in memory 22. When the reception of the data packet finishes, an end-of-receive signal is supplied to the communication control unit 21.

Figure 10:
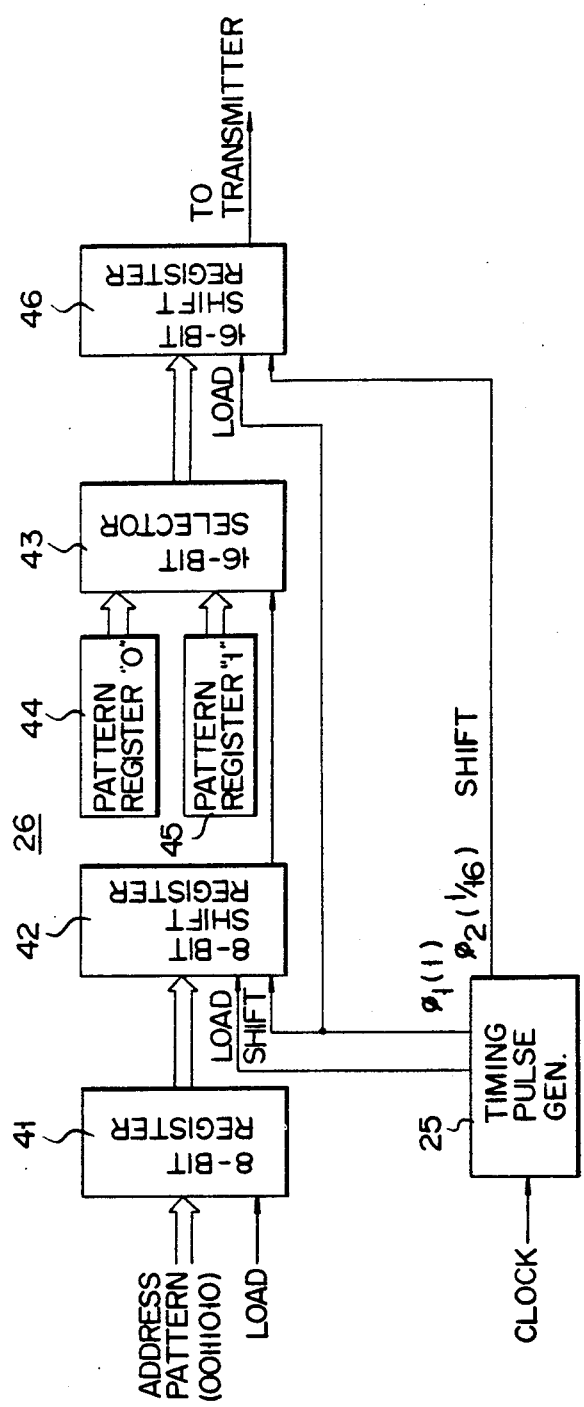
FIG. 10 is a block diagram of a collision detecting packet transmitter circuit of FIG. 9.

An example of collision detecting packet transmitting circuit 26 will be described referring to FIG. 10. The collision-detecting packet has a pulse pattern corresponding to "00111010", as shown in FIG. 4. More specifically, each slot to which "0" is allotted has a 16-bit pulse pattern of "11110 - - - 0", while each slot to which "1" is allotted has a 16-bit pulse pattern of "0 - - - 01111".

Address information of "00111010" is loaded to an 8-bit register 41. The address information loaded to register 41 is further loaded to an 8-bit shift register 42 by timing pulse generating circuit 25 which responds to the request to send collision-detecting packet. The address information loaded to shift register 42 is serially read out from shift register 42 by a clock $\phi_1$ which has a period corresponding to the width of one slot, and supplied to a 16-bit selector 43, which is responsive to an output ("1" or "0") of shift register 42 to select a pattern register 44 or 45. The pattern register 44 stores the 16-bit pulse pattern "11110 - - - 0" which corresponds to "0" of the address information, while the pattern register 45 stores the 16-bit pulse pattern "0 - - - 01111" which corresponds to "1" of the address information. The selector 43 selects pattern register 44 in response to "0" read out from shift register 42 and the pattern register 45 in response to "1". A selected pattern information is loaded to a 16-bit shift register 46 by the clock $\phi_1$. The 16-bit pattern information loaded to shift register 46 is serially read out by a clock $\phi_2$ which has a period, 1/16 of the period of the clock $\phi_1$, and sent to the transmitter. In this way, the collision-detecting packet having the pulse pattern as shown in FIG. 4 is transmitted for the time period $T_1$, as described above.

Figure 11:
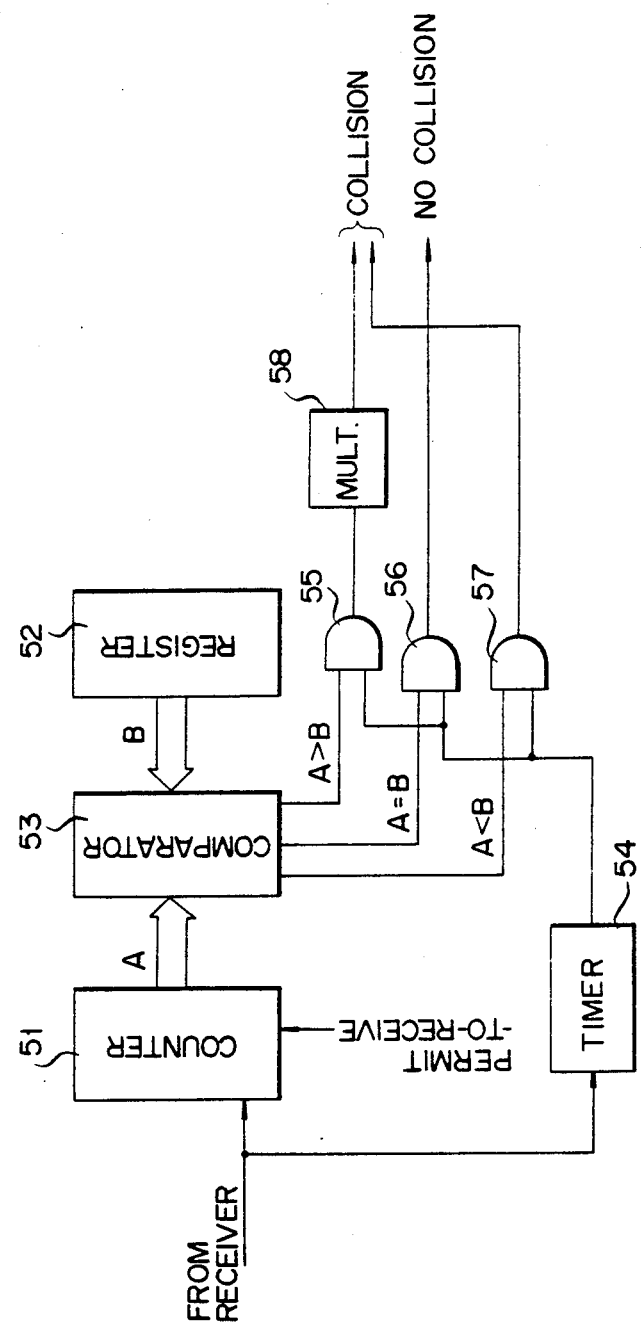
FIG. 11 is a block diagram of a collision detecting packet receiver circuit of FIG. 9.

FIG. 11 shows the collision-detecting circuit 32 which is arranged to detect the collision by counting pulses received during the time period $T_1+T_2$. The pulses received by the receiver are counted by a counter 51 which is cleared by a permit-to-receive signal from communication control unit 21. The collision-detecting packet shown in FIG. 4 has 32 pulses in total. The same is true to the collision-detecting packets transmitted from other stations. Numeral information which represents 32 is stored in a register 52.

A comparator 53 compares the content A of counter 51 with the content B of register 52. The comparator 53 has three outputs which correspond to $A>B$, $A=B$ and $A<B$, respectively. A timer 54 is provided which is triggered to operate by a first received pulse from the receiver. The timer 54 produces a high-level output for the time period $T_1$ or $T_1+T_2$ from the reception of a collision-detecting packet by the receiver, to thereby enable AND gates 55 to 57.

Figure 12:
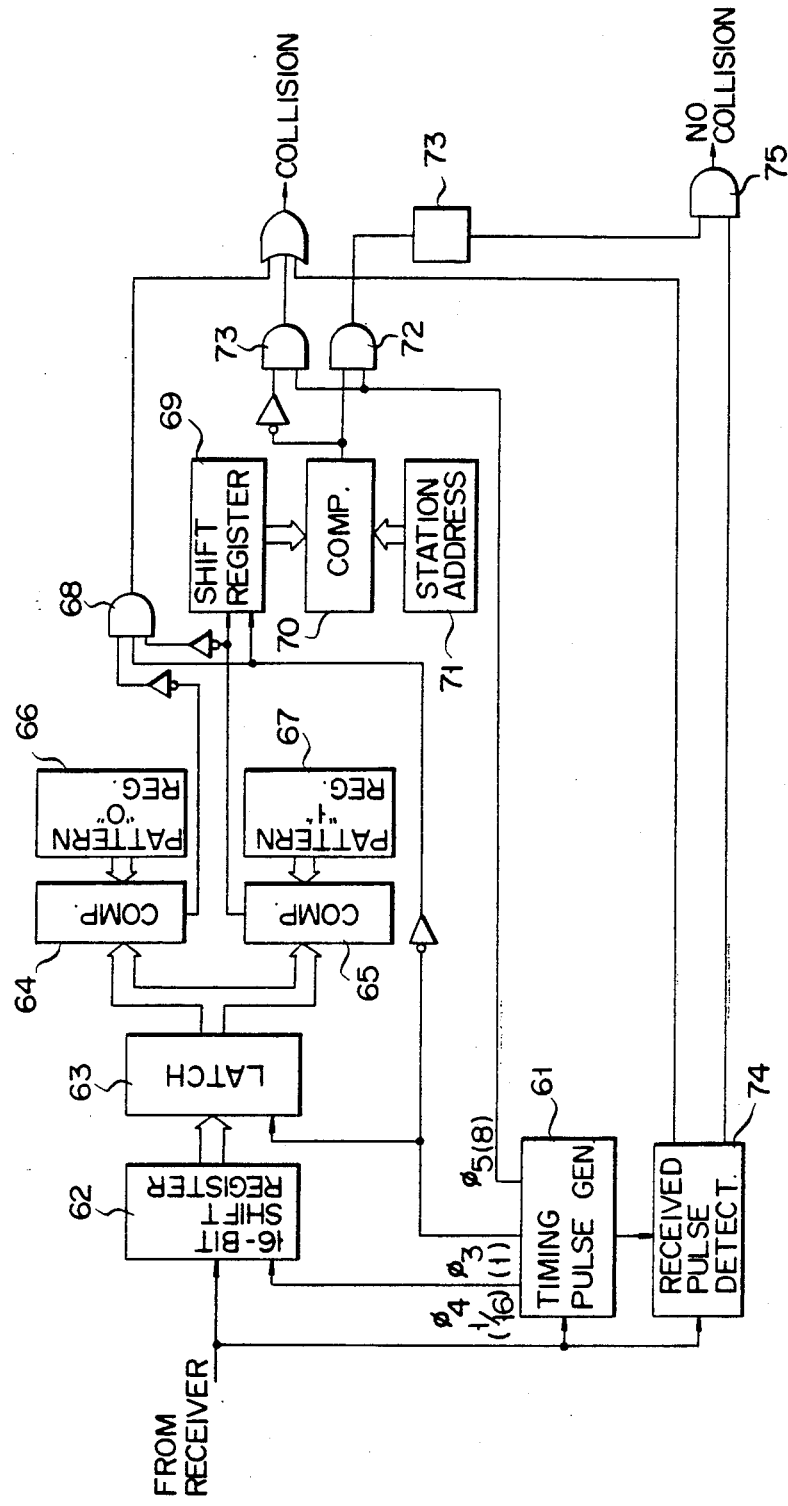
FIG. 12 shows another example of the collision detecting packet receiver circuit.

As apparent from the above description, $A>B$ represents the occurrence of collision and thus the output $(A>B)$ of comparator 53 drives a pulse generator 58 such as a multivibrator through AND gate 55 to generate a collision-detect signal. $A=B$ when no collision occurs, and thus the comparator 53 produces a no-collision detect signal through AND gate 56. It may happen sometimes that the possible superposition of pulses makes it impossible to distinguish pulses from one another when the collision has occurred. $A<B$ in this case. The comparator 53 also generates the collision-detect signal through AND gate 57 in this case. With reference to FIG. 12, the detection of collision by pattern comparison between a received collision-detecting packet and the self-address information will be described. In the case of this example, the pulse pattern of a received signal is compared with "0" pattern of "11110 - - - 0" and "1" pattern of "0 - - - 01111" for each slot, and when non-coincidence is detected, the collision-detect signal is outputted.

A timing pulse generator 61 is provided which responds to a received signal from the receiver to generate a clock $\phi_3$ which has a period corresponding to the width of the slot of the collision-detecting packet, a clock $\phi_4$ having a period which corresponds to a sixteenth of the period of the clock $\phi_3$, and a clock $\phi_5$ having a period eight times the period of the clock $\phi_3$.

The received signal from the receiver is serially read into a 16-bit shift register 62 by the clock $\phi_4$. When the 16-bit signals in one time slot are read into shift register 62, the bit pattern of shift register 62 is latched in a latch circuit 63 by the clock $\phi_3$. The bit pattern of latch circuit 63 is compared with bit patterns stored in pattern registers 66 and 67, by comparators 64 and 65. The pattern register 66 stores the bit pattern of "11110 - - - 0" and the pattern register 67 the bit pattern of "0 - - - 01111". When the 16-bit pattern latched in latch circuit 63 does not coincide with the "0" pattern of "11110 - - - 0" and the "1" pattern of "0 - - - 01111", it is deemed that the collision has occurred and the collision detect signal is output from an AND gate 68. The output "1" or "0" of comparator 65 is serially read into a shift register 69. When the collision-detecting packet having such pattern as shown in FIG. 4 is received, the address pattern "00111010" enters shift register 69 in accordance with the output of comparator 65. The output of shift register 69 is compared with a self-address pattern 71 by a comparator 70. When a coincidence occurs, the comparator 70 drives a pulse generator 73 such as a flip-flop through an AND gate 72. When no coincidence is found, the comparator 70 outputs a collision detect signal through an AND gate 73.

A reception pulse detector 74 is provided which is enabled by timing pulse generator 61 during the time period $T_2$ to detect whether or not any pulse is received by the receiver during this period. When any pulse is received by the receiver during this period, the detector 74 outputs a collision detect signal and supplies a signal to an AND gate 75 at the end of this time period $T_2$. When the received address pattern coincides with the self-address pattern, the AND gate 75 is enabled by the output of pulse generator 73. In this case, therefore, the pulse generated by reception pulse detector 74 at the end of the time period $T_2$ is output as a no-collision detect signal through AND gate 75.

It should be understood that the present invention is not limited to the collision-detecting packets which are arranged as described above. The subject matter of the present invention resides in that a time period, which is longer than the maximum propagation delay time of the network, for the collision-detecting packet and a following time interval is prepared before the data packet transmission. Two or more of the collision-detecting means which have been described may be used in combination.

What is claimed is:

1. In a contention-type data communication system wherein a plurality of stations are connected with one another through data bus, each of said stations being arrranged to monitor, through the data bus, a self data signal transmitted over the data bus, each station includes:
means for transmitting a collision-detecting packet having a predetermined time length $T_1$ and a predetermined pulse pattern, and a data packet after a time period $T_2$ from the end of the transmission of the collision-detecting packet; and
means for detecting a communication collision on the data bus in response to pulses received during a time period $T_1 + T_2$ from the start of reception of the collision-detecting packet through the data bus.

2. A contention-type data communication system according to claim 1, wherein the data communication system is an optical star-configured network system having an optical star coupler to which said stations are connected via optical fibres as the data bus, and wherein the time period $T_1 + T_2$ is set longer than or equal to two times a signal propagating delay time between said star coupler and a station which is remotest from said star coupler such that every station can detect a signal collision before transmission of a data packet.

3. A contention-type data communication system according to claim 1, wherein the collision-detecting packet transmitted from each of said stations has a predetermined number of pulses.

4. A contention-type data communication system according to claim 1, wherein pulse patterns of the collision-detecting packets transmitted from said stations are different from each other.

5. A contention-type communication system according to claim 1, wherein the collision-detecting packet is divided into three or more time slots.

6. A contention-type data communication system according to claim 1, wherein the collision-detecting packet is divided into I slots, I representing an integer larger than an integer K which is determined by $K = [\log_2 (N-1)] + 2$ ([x] represents the maximum integer not exceeding x and N, the maximum number of said stations), and each of the slots has J pulses.

7. A contention-type data communication system according to claim 6, wherein the J pulses in each of the slots of the collision-detecting packet are position-modulated in accordance with a bit pattern of an address of each of said stations.

8. A contention-type data communication system according to claim 7, wherein a head time slot of the collision-detecting packet has a pulse pattern common to said stations.

9. A contention-type data communication system according to claim 6, wherein the J pulses in each of the slots are arranged at the front or rear half of the slot according to corresponding bit of the address.

10. A contention-type data communication system according to claim 1, wherein the collision-detecting packet is divided into slots and has a pulse pattern according to the address of the station, and wherein each of the slots has a number of pulses corresponding to the corresponding bit of address.

11. A contention-type data communication system according to claim 1, wherein said collision-detecting means in each of said stations is arranged to detect the collision on the basis of the number of pulses received during a predetermined time period after the start of reception of the collision-detecting packet.

12. A contention-type data communication system according to claim 1, wherein said collision-detecting means in each of said stations is arranged to detect the collision by comparing a pulse pattern of a received collision-detecting packet with a pulse pattern of a self-transmitting collision-detecting packet.

* * * * *